United States Patent
Yamamoto et al.

(10) Patent No.: US 6,247,495 B1
(45) Date of Patent: Jun. 19, 2001

(54) FLOW RATE DETECTION MECHANISM WITH A RESTRICTION ELEMENT FOR MASS FLOW METERS

(75) Inventors: Keiichiro Yamamoto; Yoshihiro Taniguchi, both of Miyanohigashi-machi (JP)

(73) Assignee: STEC, Inc., Kyoto (JP)

( * ) Notice: Subject to any disclaimer, the term of this patent is extended or adjusted under 35 U.S.C. 154(b) by 0 days.

(21) Appl. No.: 09/452,636

(22) Filed: Dec. 1, 1999

(30) Foreign Application Priority Data

Dec. 7, 1998 (JP) .................................... 10-346886

(51) Int. Cl.[7] ................................ G01F 5/00; G01F 1/36
(52) U.S. Cl. ................................ 137/599.13; 137/487.5; 137/601.18; 138/46; 73/202; 73/861.58
(58) Field of Search ................................ 137/486, 487.5, 137/599.11, 599.13, 601.18; 138/45, 46; 73/202, 202.5, 861.52, 861.53, 861.58

(56) References Cited

U.S. PATENT DOCUMENTS 5,044,199 * 9/1991 Drexel et al. ..................... 73/202
5,099,881 3/1992 Nakajima .

* cited by examiner

Primary Examiner—John Rivell
Assistant Examiner—Ramesh Krishnamurthy
(74) Attorney, Agent, or Firm—Price and Gess

(57) ABSTRACT

A flow proportioning assembly for dividing a portion of a fluid flow such as gas for presentation to a sensor includes a holder member having a central opening and forming an exterior peripheral passageway when inserted within a conduit of a flow meter housing. A resistor member can be adjustably mounted in the central opening downstream of a holder member aperture to encourage a laminar flow pattern and a large entrance port and a large exit port can communicate with a passageway that is operatively connected with a sensor. The exit port is downstream of the resistor member. Flexible fastener members can engage the resistor member and the holder member for ease of mounting. The resistor member can also comprise a helical arrangement of small fluid passageways to encourage laminar flow.

18 Claims, 7 Drawing Sheets

FLOW RATE DETECTION MECHANISM WITH A RESTRICTION ELEMENT FOR MASS FLOW METERS

BACKGROUND OF THE INVENTION

1. Field of the Invention

The present invention relates to a flow rate detection mechanism for mass flow meters and more particularly to an improved design and mounting a restriction element.

2. Description of Related Art

Flow rate detection mechanism of mass flow meters have been constructed in such a manner as to obtain a laminar flow pattern in a gas passage, and for this type of configuration, an etching plate is used or a plurality of capillary tubes are used at a bypass section, as described in Japanese Patent Publication No. Sho 59-41126.

As shown in FIG. 9, a flow rate detection mechanism is described in Japanese Patent Publication No. Hei 6-78926 and introduces gas from a passage 1P for detecting the gas flow rate and allows gas to flow between a flow rate throttle valve 2P and a tapered inner circumferential surface 4P of a hole formed on a housing 3P in order to obtain laminar gas flow. An inflow port 5P, provided at the tapered inner circumferential surface 4P which forms a laminar flow, diverts a part of the gas into a sensor tube, and ejects the gas at an outflow port 6P. The gas is distributed to a flow rate control section via the circumferential surface 4P downstream of the outflow port 5P and before the passage 7P. On the other hand, the remainder of gas is distributed to the flow rate control section via the circumferential surface 4P and passage 7P.

The flow rate detection mechanism of the mass flow controller described in U.S. Pat. No. 5,099,881 obtains laminar gas flow by allowing gas introduced from a passage 1P' to flow into an annular passage 4P' formed by a plug 2P' and a holder 3P' both having a tapered portion, as shown in FIG. 10. And from a through hole 5P', provided halfway in the annular passage 4P', part of the gas is diverted and introduced from an injection port 6P' to a sensor section 7P', and the flow rate of this gas is measured by the sensor section 7P', discharged from an extracting port 8P' to the downstream side of the passage 9P'. The remainder of gas is distributed to the flow rate control section via the annular passage 4P' and passage 9P'.

In the conventional flow rate detection mechanisms as described above, it is important to stabilize measurement values by forming a stable laminar flow in the tapered inner circumferential surface 4P or annular passage 4P' with a flow rate throttle valve 2P and plug 2P', to achieve uniform pressure distribution, and to divide the passage for measuring the flow rate from a portion in which the stable laminar flow is formed. Such mechanism require high accuracy in manufacturing.

For example, in FIG. 9, the flow rate throttle valve 2P is fastened with a screw 8P in order to obtain stable laminar flow by accurately aligning the center axis of the flow rate throttle valve 2P to the center axis of the passage 1P. However, this configuration has defects in that many components are required and they require high care to reduce the defects in processing, and also generate metallic powders by friction with the screw 8P when the flow rate throttle valve 2P rotates. This is a problem for measuring a gas flow rate when, in particular, gas that requires purity is allowed to pass as is the case of the gas used for semiconductor manufacturing processes.

In an example shown in FIG. 10, in order to align the center axis of plug 2P' to that of passage 1P', the basic profile of plug 2P' is ground with a lathe, and then the plug 2P' must be fixed to the passage 1P' by an extremely troublesome fabrication process. That is, with each of the conventional techniques described above, there are problems of high labor and costs in manufacturing a flow rate detection mechanism.

In addition, in the above-mentioned conventional techniques, the maximum flow rate of gas allowed to flow in passages 1P, 1P' must be restricted to a level that would not generate turbulence in the gas flow. That is, in the example of FIG. 9, since even a little disturbance that occurs in the pressure distribution of the gas flowing on the tapered inner circumferential surface 4P directly affects the measurement results, gas is only allowed to flow at a flow rate that would not cause turbulence in the gas flowing on the tapered inner circumferential surface 4P.

In the example shown in FIG. 10, disturbance occurring in the laminar gas flow on the upstream side of the portion with the through hole 5P' is able to be absorbed at an annular chamber 12P' located on the outer circumference of the holder 3P' to some extent, but any turbulence in the outer circumferential portion 13P' of the plug 2P' in free communication with the extracting port 8P' has serious effects on measurement results.

In the flow rate detection mechanism, as in the case of FIG. 10, gas is not only restricted to flow at a flow rate that would not cause turbulence around plug 2P' on the downstream side 13P' of the annular passage 4P', but also the center axes of the passage 9P', holder 3P', and plug 2P' must be meticulously aligned in order to prevent any occurrence of turbulence at the outer circumferential portion 13P' of plug 2P'. In addition, because the chamber 12P', as shown in FIG. 10, is intended to absorb pressure fluctuations by its volumetric capacity, a gas collection portion 14P' is generated in a passage causing degradation of replacement characteristics of gas when gas is changed over.

In all of the above-mentioned examples, the profiles of the flow throttle valve 2P and plug 2P' that can form stable laminar flow are those that can suppress the maximum flow rate of gas allowed to flow in passages 1P, 1P' to a specified limit, and it is a practical limit to allow gas to flow at a flow rate of about 20 L/s at flow throttle valve 2P and plug 2P' about 25 mm long. Consequently, to allow gas to flow accurately at a greater flow rate, the precision of the flow rate detection mechanism must be increased and this not only increases the manufacturing cost, but also causes the overall profile of the mass flow controller to be outside the planned dimensions.

SUMMARY OF THE INVENTION

It is an object of this invention to provide a flow rate detection mechanism for a mass flow meter which can achieve stable laminar flow even when pressure on the inlet-side of the sensor section varies and at the same time can greatly improve gas replacement characteristics and enable fine adjustment of the gas flow rate, as well as achieve better affinity to a sensor.

The flow rate detection mechanism for mass flow meters comprises a cylindrical holder inserted into a hole inside a block, an annular groove on the outer circumferential portion of the inlet end of the holder, a through hole for allowing gas to flow into the annular groove from the inlet end of the holder, a resisting member inserted into the holder where in a bypass passage is formed between the resisting member and the holder, a gas introducing hole in free communication with the annular groove, a gas discharging hole in free communication downstream of the holder, a sensor passage tube connected to the gas introducing hole and the gas discharging hole, wherein the gas flowing from the inlet side of the holder collides against the resisting member and is divided, with part of the gas flowing into the through hole, and the remainder flowing into the bypass passage inside the holder.

Consequently, because an annular groove is in free communication with the gas introducing hole, a gas approaching section is provide d by the annular groove and at the same time the pressure distribution can also be alleviated. That is, the gas condition of the gas introducing hole is free from pressure fluctuation by achieving the laminar flow condition within the annular groove, and the flow rate can be measured in accordance with the difference between gas pressures upstream and downstream of the resisting member.

In addition, because the gas flow of the bypass passage which is restricted by the resisting member no longer has to be a laminar flow and measurement results are no longer adversely affected even when only a little turbulence is generated, there is no restriction to the profile of the resisting member or the positional relationship between the resisting member and the holder, and it no longer costs a large amount of money for forming the flow rate detection mechanism. That is, a flow rate detection mechanism for mass flow meters which can constantly carry out stable measurement can be offered at low cost. Furthermore, by simplifying the construction of the resisting member, maintenance, such as cleaning the flow rate detection mechanism of mass flow meters, can be made easy, while reducing the number of irregular surfaces reduces the contact area as well as the reduce gas collecting portions to improve the replacement characteristics, and at the same time, there is no problem of mixing impurities, such as metal powders, into the flowing gas.

When a tapered portion is formed on the inner circumferential portion of the holder, and on the outer circumferential portion of the inserted resisting member, wherein the two tapered portions are parallel, and the position of the resisting member is adjusted to enable free adjustment of the size of the resistance of the bypass passage, a wide variety of flow rates are able to be set by the holder and the resisting member, thereby enabling the reduction of the number of components and the production cost can further be reduced.

When the resisting member is formed by cylindrical rolling of a strip material with a plurality of ribs on the surface and a flat strip material via the ribs, a plurality of holes parallel to each other are formed in the cylindrical axis direction as the bypass passage, stable measurement can be carried out even with gas flowing at a large flow rate.

And when a resisting member partly ground in the longitudinal direction to allow gas to flow from the holder inlet side to the outlet side is inserted in the holder inside and the bypass passage is formed, resistance by the resisting member can be accurately set, and gas flowing at a small flow rate can be measured highly accurately.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a flow rate detection mechanism of mass flow meters.

Figure 1:
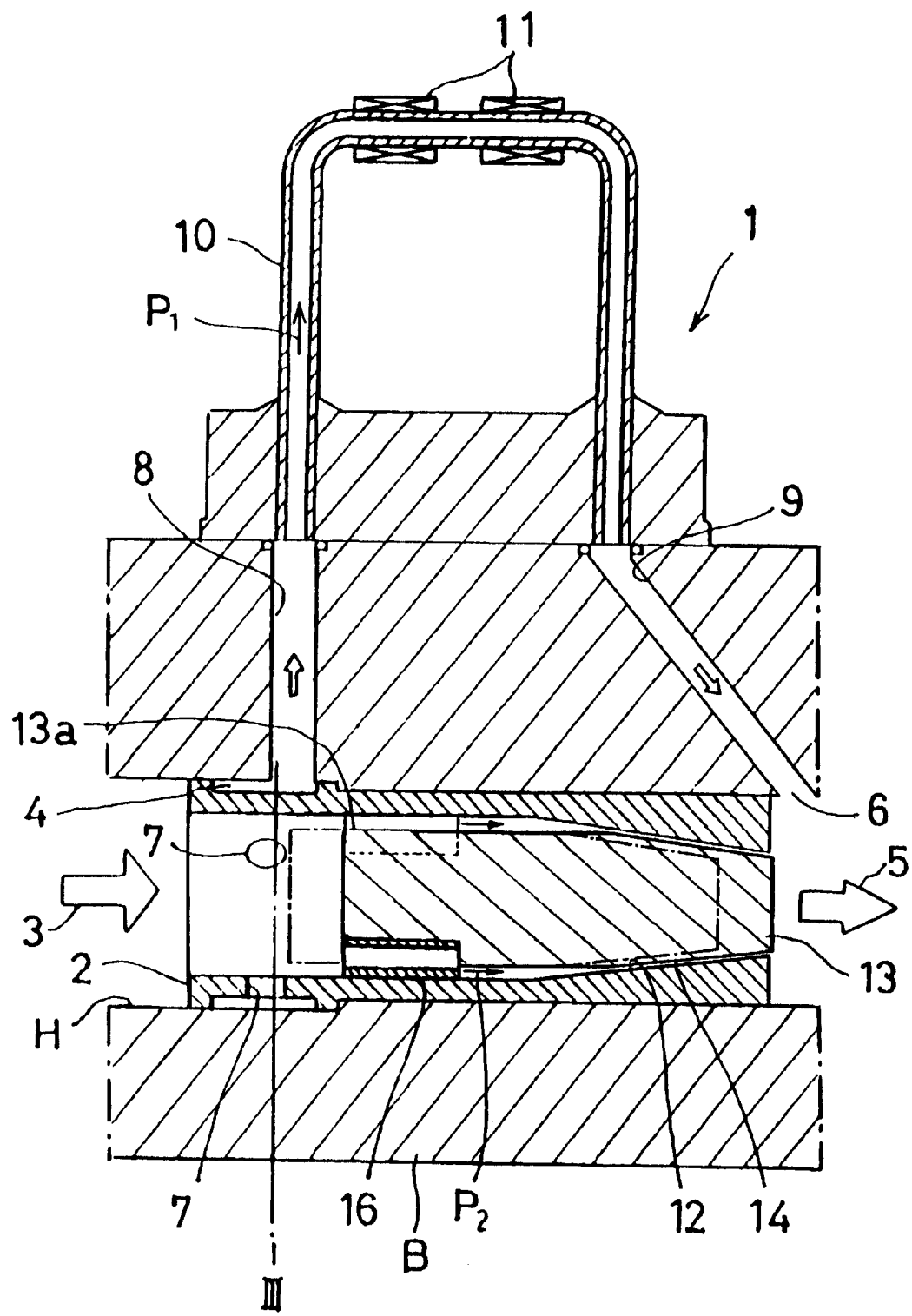
FIG. 1 is a cross-sectional view showing one example of a flow rate detection mechanism of mass flow meters according to the present invention.
Figure 2:
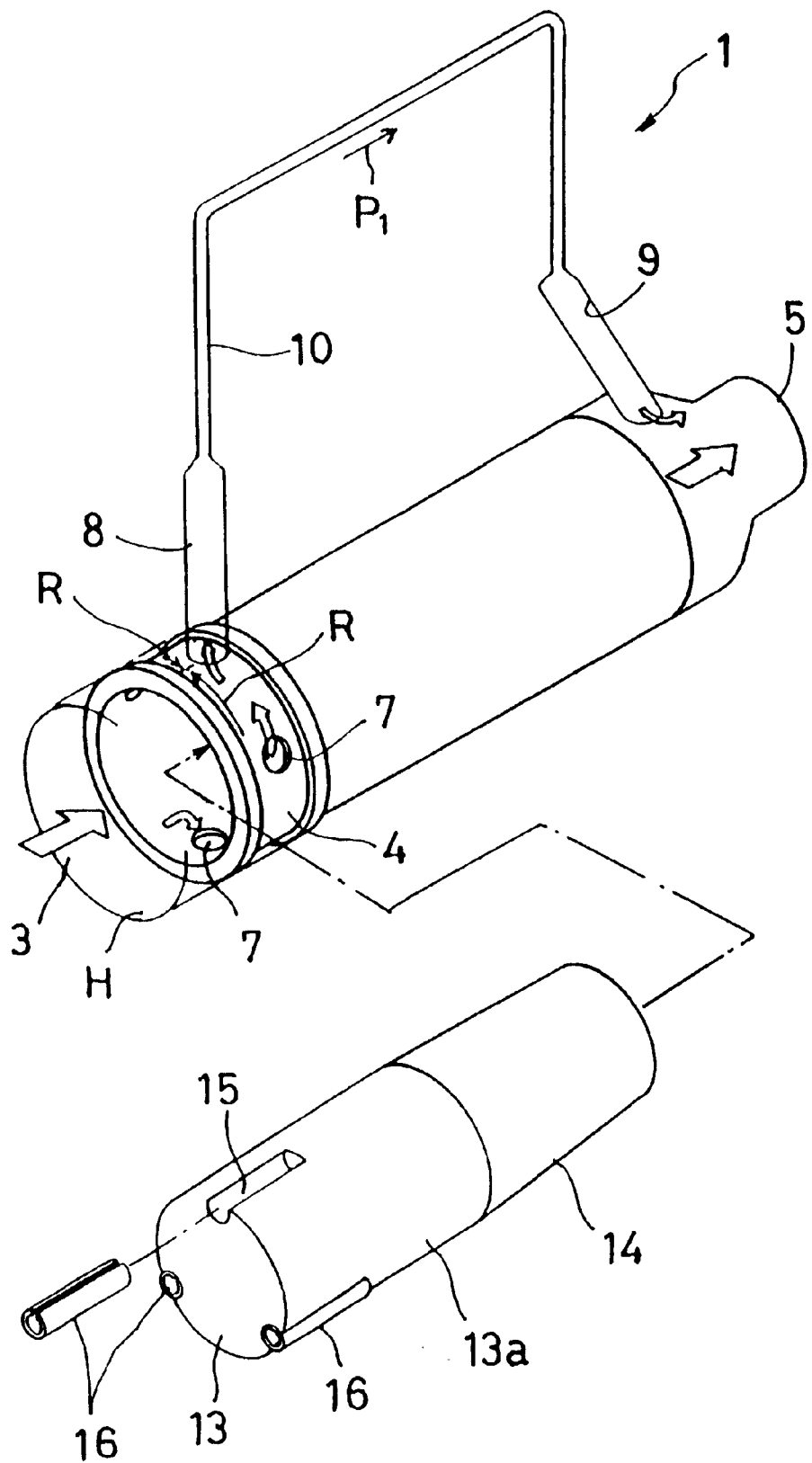
FIG. 2 is an exploded perspective view of the flow rate detection mechanism of mass flow meters.
Figure 3:
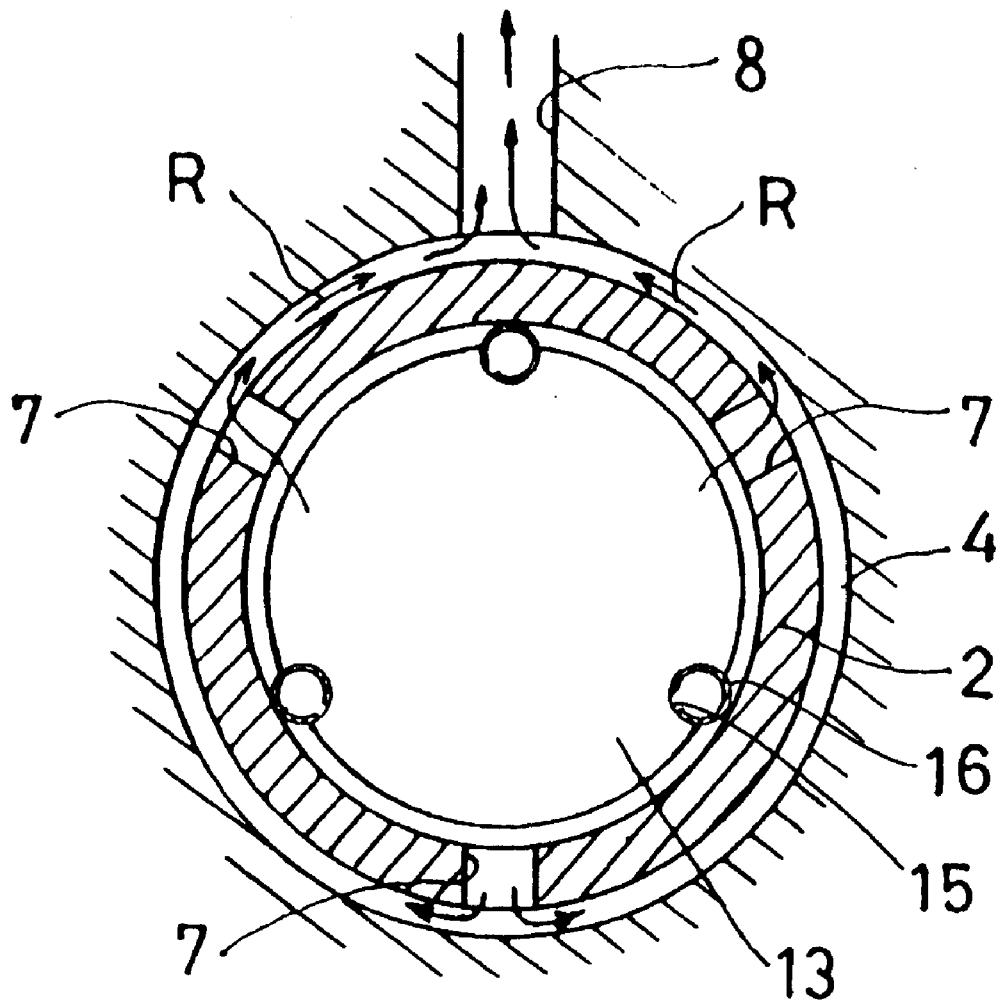
FIG. 3 is a cross-sectional view showing the flow rate detection mechanism of mass flow meters.

Referring now to the drawings, preferred embodiments according to the present invention will be described in detail hereafter. FIG. 1 is a cross-sectional view of a fluid flow rate detection mechanism 1 of a mass flow meter, and FIG. 2 is an expanded perspective view of the flow rate detection mechanism 1. FIG. 3 is a cross-sectional view, as seen from sectional view III of the flow rate detection mechanism 1 in FIG. 1.

As shown in FIG. 1, the mass flow meter related to the present invention has a nearly cylindrical holder 2 inserted into a conduit or hole H provided in a housing or block B in the flow rate detection mechanism 1 and is constructed to introduce gas flowing from the inlet 3 of the flow rate detection mechanism 1 into the holder 2. On the outer circumferential portion of the inlet end of the holder 2, an undercut or clearance 4 of an annular groove (hereinafter the inside of the annular groove is expressed as a clearance 4) is provided. In addition, on the clearance 4, a plurality of through holes or apertures 7 are provided for allowing gas to circulate into the clearance 4. In the present example, through holes 7 are provided, for example, in three pieces, but any number is acceptable.

Figure 9:
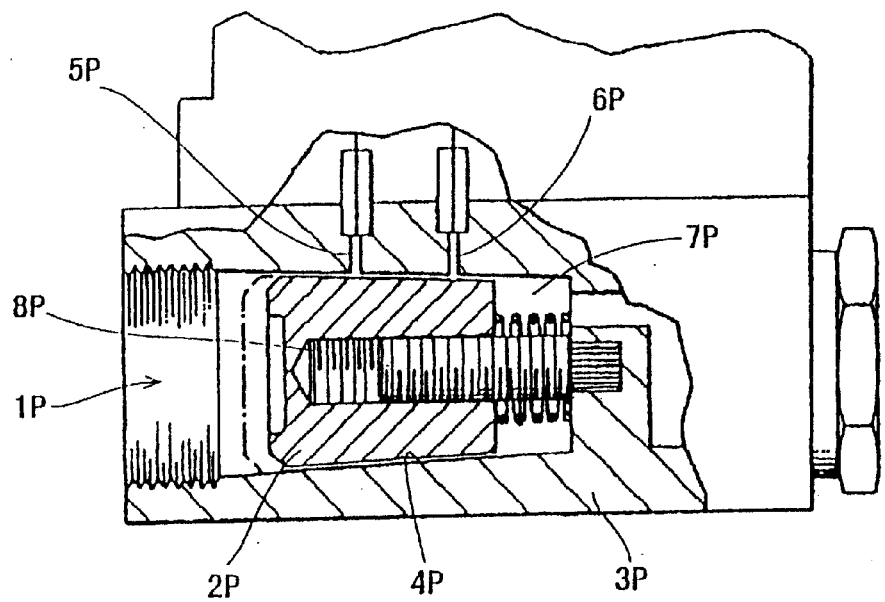
FIG. 9 is a cross-sectional view of a conventional flow rate detection mechanism.
Figure 10:
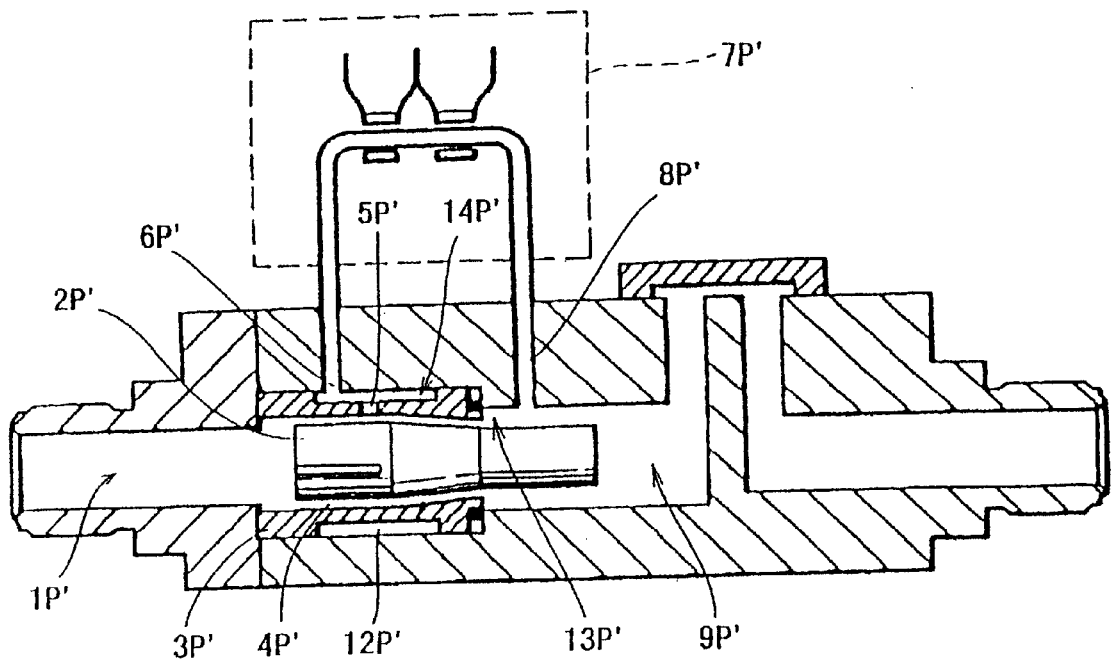
FIG. 10 is a cross-sectional view of a conventional flow rate detection mechanism of mass flow controllers.

The through hole 7 is formed at the center of the clearance in the width direction, but since the clearance 4 is intended to alleviate pressure fluctuations by forming an approaching or introduction section R for making the gas flow into a laminar flow pattern and is not intended to alleviate volumetric pressure fluctuations of gas flow in the width direction of the clearance 4. That is, as in the case of the conventional example shown in FIG. 9, it does not form a gas collecting portion 14'. The portions where gas tends to collect in the clearance 4 may be positively eliminated by forming the through hole 7 at the upstream end portion of the clearance 4.

Reference numeral 8 is a gas introducing port or hole in the block B which is in free communication with the downstream end portion of the clearance 4, while reference numeral 9 is a gas discharging port or hole formed diagonally in the block B to freely communicate to the inside of the hole H downstream of the holder 2. A sensor passage tube 10 is connected to the gas introducing hole 8 and gas discharging hole 9, and the flow rate is measured by allowing the gas flowing in this sensor passage tube 10 to pass the sensor portion 11. That is, it is configured in such a manner as to prevent gas collecting portions from being formed in any of the gas passages connected to the sensor section 11.

In addition, on an inner circumferential surface of the holder 2, a tapered portion 12 is formed, and at the outer circumferential portion of a restrictor or resisting member 13 inserted into the holder 2, a tapered portion 14, parallel to the tapered portion 12 of the holder, is formed. For the resisting member 13, it is essential to fix it in such a manner that the through hole 7 is located upstream of a major axis portion 13a of a nearly cylindrical portion of the resisting member or plug 13, and the gas flow flowing in the through hole 7 is intended to be free from any influence of any pressure distribution of the gas stream flowing around the major axis portion 13a.

The resisting member 13 has grooves 15 ground along a longitudinal direction of the outer circumference of the major axis portion 13a after grinding the resisting member 13 into the basic profile (cylindrical major axis portion 13a and the tapered portion 14), for example, with a lathe. When the resisting member 13 is fixed to the holder 2, the resisting member 13 is held in place by an elastic deformation of a plurality of fasteners 16 with C-letter cross-section by inserting them into the groove 15. The fasteners 16 have a diameter that will provide an interference fit within the circumference of the grooves or bores 15 when they are released.

This invention does not intend to limit the method for fixing the resisting member 13 to the holder 2. For example, a method for providing three each of the grooves 15 and fasteners 16 is shown, but in the case of a large-diameter resisting member 13, any variation is possible including using four or more fasteners 16 for fixation.

By the above-mentioned configuration, gas flowing in from the inlet 3 of the flow rate detection mechanism 1 is made turbulent by colliding against the resisting member 13, and part of the gas is diverted or proportioned and passes through holes 7 and flow into the measuring passage $P_1$ (that is, gas flowing in the horizontal direction is diverted to circulate in the vertical direction). When gas passes the through hole 7, the gas forms a laminar flow by passing the approaching section R where gas flows along the outer circumference of the holder 2 in the clearance 4 and at the same time the gas pressure fluctuations are alleviated. Then, when this gas circulates into the gas introducing hole 8, the gas pressure fluctuations are further alleviated and a stable gas stream is supplied to the sensor passage tube 10.

The gas passing through the sensor passage tube 10 (measuring passage $P_1$) flows out to the outlet 5 of the flow rate detection mechanism 1 via the gas discharging hole 9. In this event, even if a turbulence of a certain level is generated in the gas stream between the holder 2 and the resisting member 13, the influence generated by this pressure fluctuation is absorbed by the gas discharging hole and does not affect the gas stream passing the sensor passage tube 10.

Both the gas introducing hole 8 and the gas discharging hole 9 have cross-sectional areas greater than that of the sensor passage tube 10, and by increasing the volume, pressure fluctuation remaining in the gas stream is absorbed, but since there is no place for forming pools in the gas passage for the gas introducing hole 8 and the gas discharging hole 9, the gas replacement characteristics are good. In addition, when sufficient effects can be obtained with the clearance 4, the gas replacement characteristics can be improved by reducing the gas introducing hole 8 and the gas discharging hole 9. Furthermore, it is also conceivable to omit the gas introducing hole 8 and gas discharging hole 9 in the present invention as an alternative embodiment.

The flow rate detection mechanism of the mass flow meter according to the present invention is designed to keep the gas flowing in the clearance 4 and the pressure of gas flowing into the gas introducing hole 8 constant to obtain a stable laminar flow. Even if any fluctuations are generated in the gas flow rate flowing in from the inlet 3, it is possible to allow gas to stably flow at a rate proportional to the gas pressure difference generated between the inlet 3 and the outlet 5 of the flow rate detection mechanism 1, and a constantly stable flow rate measurement can be carried out.

On the other hand, the remainder of gas which collide against the resisting member 13 and become turbulent circulates into a bypass passage $P_2$ between the resisting member 13 and the inner surface of the holder 2 and circulates into the flow rate control section, not illustrated, via the outlet 5. Further downstream of the downstream end of the holder 2, the gas flow smoothly joins the gas passing through the gas discharging hole 9, and circulates into the flow rate control section, not illustrated. In this event, the pressure difference between the inlet 3 and the outlet 5 is related to the flow rate of gas passing the bypass passage and the size of the resistance caused by the resisting member 13.

By allowing the gas passing the measurement passage $P_1$ and the gas passing the bypass passage $P_2$ to join downstream of the downstream end of the holder 2 and the resisting member 13, the influence of turbulence of the gas flow which might be generated by the resisting member 13 is prevented from appearing in the gas flowing in the measurement passage $P_1$. That is, if the pressure difference is of such a level that it holds a proportional relationship with the gas flow rate flowing in the bypass passage $P_2$, the measurement values will not be affected even if some turbulence is generated by the resisting member 13.

Consequently, because it is no longer necessary to form a laminar flow free of turbulence in the passage between the resisting member 13 and the holder 2 and the center axis of the resisting member 14 no longer has to be aligned with the holder 2, the resisting member 13 can be formed in an easier and simpler fabrication process. Since the profile of the resisting member 13 is simple, it is possible to avoid generation of gas collecting portions or metallic powders by the resisting member and at the same time, maintenance operations including cleaning can be carried out more easily.

In addition, it is possible to adjust the size of the resistance of the resisting member 13 by way of the positional relationship between the resisting member 13 and the holder 2 by forming tapers 12, 14 on the inner circumferential surface of the holder 2 and the resisting member 13 as is the case of this example. That is, different kinds of flow rate detection mechanisms 1 with a varied flow rate measuring range can be formed by the holder 2 and the resisting member 13, and a remarkable reduction in production cost can be made.

FIG. 1 discloses the position of the resisting member 13 in which the measurement flow rate is brought to a minimum, and shows the position of the resisting member 13 in which the measurement flow rate is brought to a maximum in the alternate long and short dash line. It is essential to position the upstream end portion of the resisting member 13 on the downstream side of the hole 7 to carry out a stable measurement free of the profile of the resisting member 13 when the measurement flow rate, shown with the alternate long and short dash line, is brought to the maximum. In addition, it is also essential to position the downstream end portion of the resisting member 13 upstream of the freely communicating position of the gas discharging hole 9 when the measurement flow rate is brought to the minimum and to allow gas passing through the gas hole 9 to enter the open portion downstream of the resisting member 13 in order to prevent the influence of turbulence caused by the position of the resisting member 13 with respect to the hole H.

Figure 4:
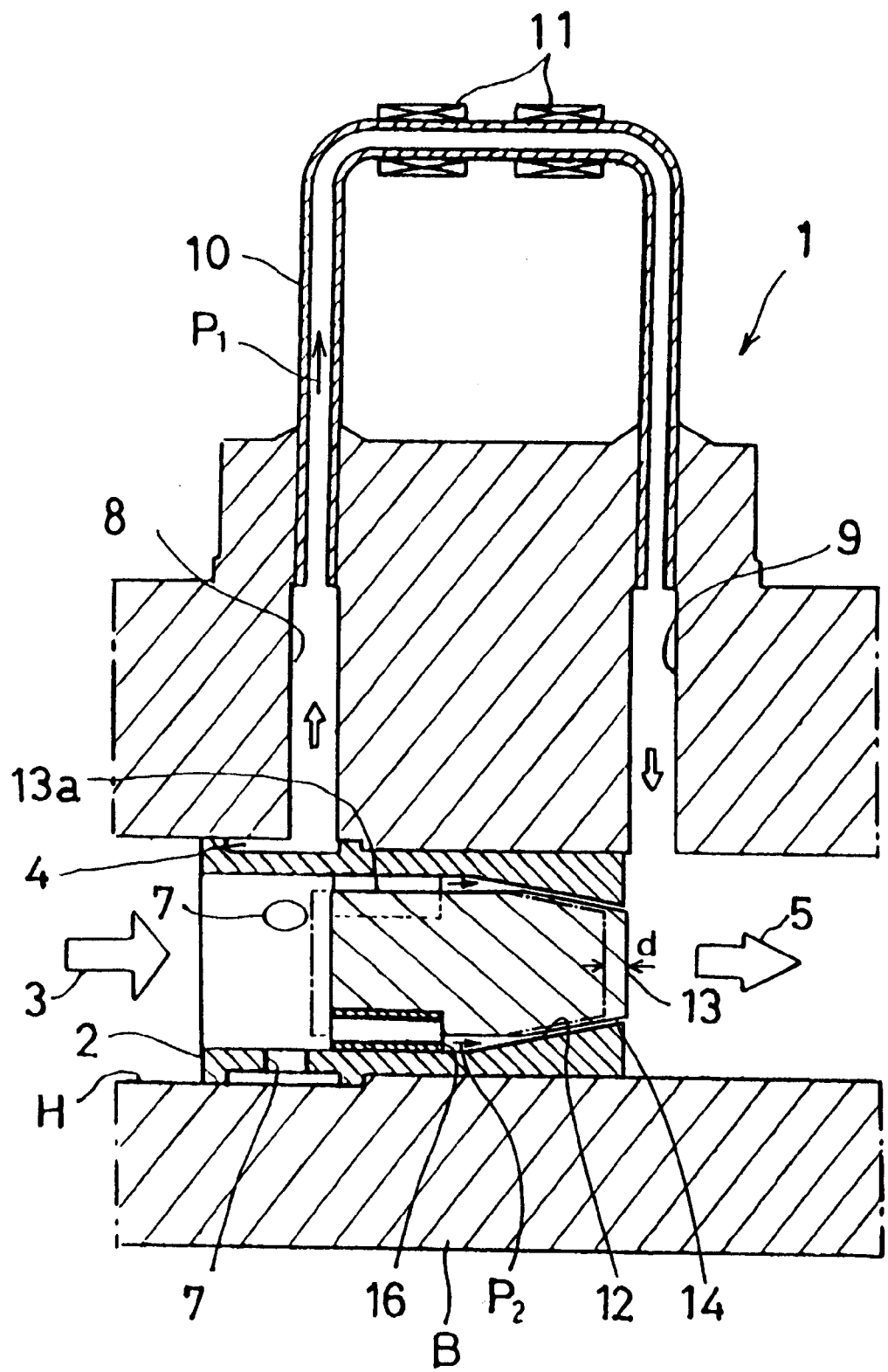
FIG. 4 is a cross-sectional view showing one variation of the flow rate detection mechanism of mass flow meters.

FIG. 4 shows another example of the present invention, and in this figure, members given the same reference numbers in FIGS. 1 through 3 are the same or equivalent members, and a detailed description will be omitted. The flow rate detection mechanism 1 shown in this example has the length of the resisting member 13 and the holder 2 shortened. That is, using the flow rate detection mechanism 1 according to the present invention, it is possible to prevent influence of the turbulence caused by the resisting member 13 and to form the resisting member 14 in a still more compact form. Consequently, the size of the whole equipment can be reduced.

FIG. 4 shows the position of the resisting member 13 when the measurement flow rate is brought to the minimum, while the position of the resisting member 13 when the measurement flow rate is brought to the maximum is shown with the alternate long and short phantom dash line. That is, in the case when the measurement flow rate is brought to the minimum, the downstream end portion of the resisting member 13 is located upstream of the freely communicating position of the gas discharging hole 9, and the influence of the turbulence caused by the resisting member 13 can, thereby, be prevented from appearing in the measurements.

Again, also in the case when the measurement flow rate is brought to the maximum (when it is shown in the alternate long and short dash line), locating the upstream end portion of the resisting member 13 on the downstream side of the hole 7 enables stable measurements, irrespective of the profile of the resisting member 13. In this example, the displacement variable d of the resisting member 13 for changing the measurement flow rate is limited to, for example, around 2.5 mm.

Figure 5:
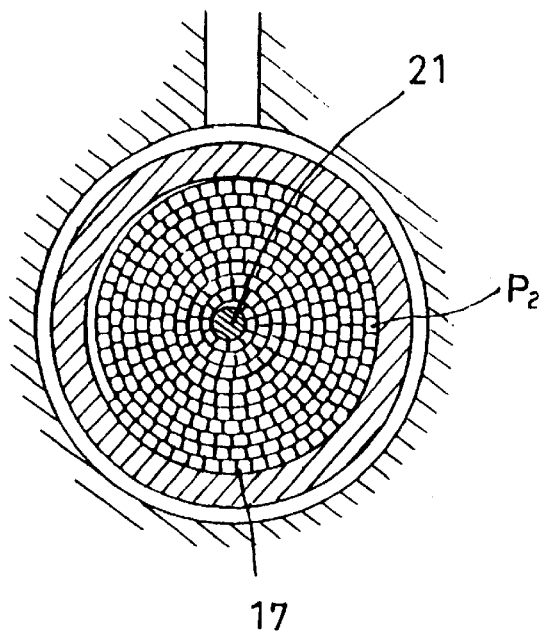
FIG. 5 is a cross-sectional view showing another example of a resisting member which is part of the flow rate detection mechanism of mass flow meters.

FIG. 5 is a cross-sectional view showing another example of the present invention, where an example for measuring a large flow rate of gas is shown. In FIG. 5, the difference from the examples shown in FIGS. 1–4 is the profile of the holder 2 and the resisting member 13. Consequently, in order to avoid a duplicated explanation, members given the same reference numbers in the examples shown in FIGS. 1–4 are the same or equivalent members.

Figure 6:
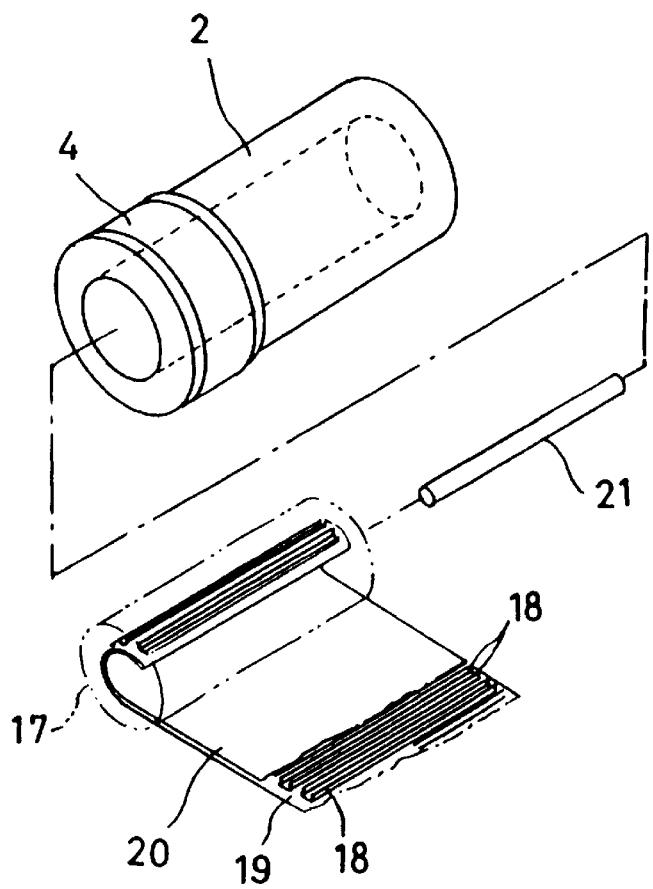
FIG. 6 is an illustration showing a manufacturing process of the resisting member.

In FIG. 5, reference numeral 17 indicates a resisting or resistor member comprising laminar flow elements formed with a plurality of holes parallel to the longitudinal direction of the bypass passage $P_2$. This resisting member 17 is formed by cylindrical rolling up of a first flexible strip material or substrate 19 with a plurality of upstanding spaced ribs 18 on the surface and a second flexible flat cover strip 20 wound around a core material 21 and offset from the substrate 19 by the ribs 18, as shown, for example, in Figure 6.

The resistor member 17 forms a consecutive series of helically wound small flow passageways to provide laminar flow.

Consequently, by forming the bypass passage $P_2$ by inserting the resisting member 17 into the holder 2, the resistance generated in the bypass passage $P_2$ becomes extremely small. That is, by configuring the bypass passages in this example, even when a large volume of gas is allowed to flow at about 50 L/s with the resisting member, for example, about 25 cm long, it is possible to set the flow rate of gas flowing in the measuring passage $P_1$ to a measurable range in the sensor section 11 (see FIG. 1). That is, a high flow rate of gas is able to be accurately measured. In this example, it is essential to locate the through hole 7 still more upstream of the upstream end of the resisting member 17 as in the case of examples shown in FIGS. 1–4 in order to achieve an accurate flow rate measurement.

Figure 7:
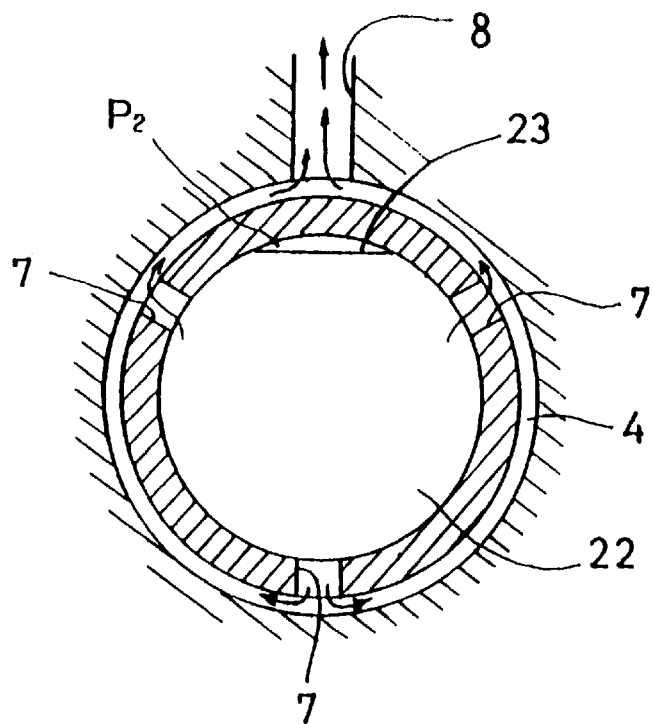
FIG. 7 is a cross-sectional view showing one variation of the resisting member.

FIG. 7 is a cross-sectional view showing still another example of the present invention, which is suited for measurement of the flow rate of gas flowing at a small flow rate. In FIG. 7, reference numeral 22 is a resisting member which is in a nearly cylindrical form in order to allow the outer circumference to fit inside the holder 2 and which has a portion 23 partly flat in the longitudinal direction. By the resisting member 22 shown in this example, the cross-sectional area of the bypass passage $P_2$ can be accurately set by the flat portion 23, and the resistance caused by the resisting member 22 can be meticulously set. Consequently, the measurement accuracy when gas is allowed to flow at a small flow rate can be improved.

Figure 8:
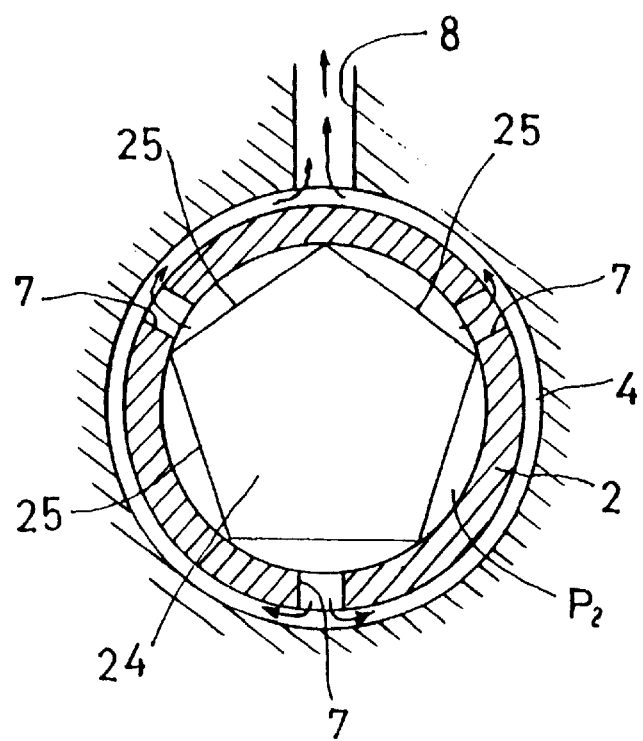
FIG. 8 is a cross sectional view showing another variation of the resisting member.

FIG. 8 shows a variation of the resisting member in which the resisting member 24 has a polygonal (for example, pentagonal) cross-section. That is, with each flat portion 25, a bypass passage $P_2$ with an accurate cross-section is able to be formed, and the flow rate is able to be exactly set and can be increased as compared to that of the example shown in FIG. 7.

Furthermore, the resisting member of the present invention may be formed with etching plates piled up or a bypass passage $P_2$ may be formed with capillaries.

As described above, with the flow rate detection mechanism of the mass flow meter according to this invention, gas pressure fluctuation is able to be alleviated by an annular clearance formed at the portion of the holder with a gas introducing hole, and the flow rate can be measured on the basis of the difference between the upstream and the downstream pressure of the resisting member. That is, it is no longer necessary to bring the gas flow to a laminar flow in a bypass passage restricted by the resisting member, even if turbulence occurs, it does not affect the measurement results. The degree of freedom is achieved in the profile of the resisting member, and there is no restriction to the positional relationship between the resisting member and the holder. That is, the cost required for formation of the flow rate detection mechanism can be reduced to a minimum and measurement can be stably carried out constantly.

In addition, by simplifying the construction of the resisting member, maintenance, such as cleaning of the flow rate detection mechanism of the mass flow meter, can be made easier, and it becomes possible to improve the replacement characteristics by reducing the contact area and reducing the gas pools, and there is no problem of mixing impurities, such as metal powders, into the circulating gas.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A flow rate detection mechanism comprising:

a housing having a conduit for gas flow;

a hollow holder inserted in the conduit wherein the holder has an annular groove on an outer surface of the holder, the holder has a through hole connecting the annular groove with an inner surface of the holder, and a portion of the gas flowing into the holder flows into the through hole;

a resisting member inserted in the holder downstream of the through hole wherein a plurality of grooves are provided in an outer surface of the resisting member, the resisting member is held in place by elastic fasteners, each of which has a C-letter cross section and is inserted into one of the plurality of grooves by elastic deformation;

a bypass passage formed between the outer surface of the resisting member and the inner surface of the holder, the housing further having a gas introducing hole connected at one end to a space defined between the conduit and the annular groove and a gas discharging hole connected at one end to a portion of the conduit downstream of the holder; and a sensor passage tube connecting the gas introducing hole with the gas discharging hole wherein a cross sectional area of an inner surface of the sensor passage tube is smaller than a cross sectional area of the gas introducing hole and the gas discharging hole.

2. The flow rate detection mechanism according to claim 1 wherein the inner surface of the holder includes a tapering portion, the outer surface of the resisting member includes a tapering portion parallel to the tapering portion of the holder, and the position of the resisting member in the holder is adjustable to adjust the volume of the bypass passage.

3. The flow rate detection mechanism according to claim 1 wherein a portion of the resisting member is flat in a longitudinal direction of the resisting member.

4. A flow rate detection mechanism comprising:

a housing having a conduit for gas flow;

a hollow holder inserted in the conduit wherein the holder has an annular groove on an outer surface of the holder, the holder has a through hole connecting the annular groove with an inner surface of the holder, and a portion of the gas flowing into the holder flows into the through hole;

a resisting member is inserted in the holder downstream of the through hole wherein the resisting member is formed by rolling up a first strip material having a plurality of ribs on one surface and a second strip material placed on top of the plurality of ribs, wherein the first strip material, the second strip material and the plurality of ribs define a plurality of elongated parallel holes which collectively form a gas bypass passage;

the housing further having a gas introducing hole connected at one end to a space defined between the conduit and the annular groove and a gas discharging hole connected at one end to a portion of the conduit downstream of the holder; and a sensor passage tube connecting the gas introducing hole with the gas discharging hole wherein a cross sectional area of an inner surface of the sensor passage tube is smaller than a cross sectional area of the gas introducing hole and the gas discharging hole.

5. A flow rate detection mechanism comprising:

a housing having a conduit for gas flow;

a hollow holder inserted in the conduit wherein an inner surface of the holder includes a tapering portion, the holder has an annular groove on an outer surface of the holder, the holder has a through hole connecting the annular groove with an inner surface of the holder, and a portion of the gas flowing into the holder flows into the through hole;

a resisting member is inserted in the holder downstream of the through hole wherein an outer surface of the resisting member includes a tapering portion parallel to the tapering portion of the holder;

a bypass passage is formed between the outer surface of the resisting member and the inner surface of the holder wherein the volume of the bypass passage is adjusted by adjusting the position of the resisting member in the holder;

the housing further having a gas introducing hole connected at one end to a space defined between the conduit and the annular groove and a gas discharging hole connected at one end to a portion of the conduit downstream of the holder; and a sensor passage tube connecting the gas introducing hole with the gas discharging hole wherein a cross sectional area of an inner surface of the sensor passage tube is smaller than a cross sectional area of the gas introducing hole and the gas discharging hole.

6. The flow rate detection mechanism of claim 5 wherein the resisting member includes a peripheral surface with a plurality of peripheral edges engaging the inner surface of the hollow holder and extending outward from the remainder of the peripheral surface.

7. A flow proportioning assembly for dividing a portion of a fluid flow in a conduit for presentation to a sensor comprising:

a holder member having a central opening and forming an exterior peripheral passageway when inserted within the conduit, the holder member having an aperture for communications with the exterior peripheral passageway; and a resistor member mounted in the central opening downstream of the holder member aperture, the resistor member provides a laminar flow pattern to the fluid flow through the central opening wherein the resistor member includes a helical arrangement of consecutive flow passageways extending along the central opening.

8. The flow proportioning assembly for claim 7 wherein the flexible fastener members are C-shaped cylinders and the resistor member includes grooves configured to hold the C-shaped cylinders for a friction fit with holder member.

9. The flow proportioning assembly of claim 7 wherein the resistor member includes a flexible strip substrate having a plurality of raised ribs.

10. A flow meter assembly comprising:

a housing having a conduit therethrough;

a sensor for measuring fluid flow;

a fluid passageway having an entrance port on the conduit and a downstream exit port on the conduit, the fluid passageway is operatively connected to the sensor between the entrance port and the exit port.;

a holder member, mounted in the conduit to communicate with the entrance port and to be positioned before the exit port, having a central opening, the holder member includes a groove on its exterior surface in fluid communication with the entrance port and the central opening whereby a portion of the fluid traveling through the housing conduit is directed to the sensor and subsequently returned downstream of the holder member; and a resistor member mounted in the central opening of the holder member downstream of the entrance port to provide a laminar flow pattern to the fluid flow through the central opening.

11. The flow meter assembly of claim 10 further including flexible fastener members for engaging the resistor member and the holder member for mounting the resistor member in the holder member.

12. The flow meter assembly of claim 11 wherein the flexible fastener members are C-shaped cylinders and the resistor member includes grooves configured to hold the C-shaped cylinders for a friction fit with the holder member.

13. The flow meter assembly of claim 10 wherein the resistor member includes a helical arrangement of consecutive flow passageways extending along the central opening.

14. The flow meter assembly of claim 10 wherein the resistor members includes a flexible strip substrate having a plurality of raised ribs.

15. The flow meter assembly of claim 10 wherein the openings of the entrance port and exit port are larger than the cross section of the fluid passageway.

16. The flow meter assembly of claim 10 wherein the resistor member includes a peripheral surface with a plurality of peripheral edges engaging the central opening of the holder member and extending outward from the remainder of the peripheral surface.

17. A flow proportioning assembly for dividing a portion of a fluid flow in a conduit for presentation to a sensor comprising:

a holder member having a central opening and forming an exterior peripheral passageway when inserted within the conduit, the holder member having an aperture for communications with the peripheral passageway;

a resistor member mounted in the central opening downstream of the holder member aperture, the resistor member provides a laminar flow pattern to the fluid flow through the central opening; and C-shaped cylinders for engaging grooves in the resistor member configured to hold the C-shaped cylinders for a friction fit with the holder member.

18. A flow proportioning assembly for dividing a portion of a fluid flow in a conduit for presentation to a sensor comprising:

a holder member having a central opening and forming an exterior peripheral passageway when inserted within the conduit, the holder member having an aperture for communications with the peripheral passageway; and a resistor member mounted in the central opening downstream of the holder member aperture, the resistor member provides a laminar flow pattern to the fluid flow through the central opening and includes a flexible strip substrate having a plurality of raised ribs.

* * * * *